May 12, 1925.
C. C. JENSEN
FASTENING DEVICE
Filed June 18, 1923
1,537,678
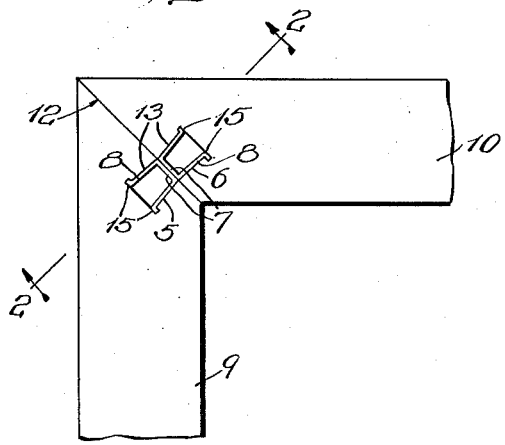
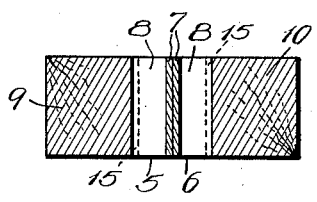
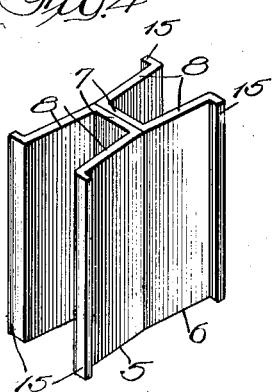
Witnesses:
W. F. Kilroy
Harry E. White
Inventor:
Carl C. Jensen
By Brown Boettcher Dienner
Attys.

Patented May 12, 1925.

1,537,678

UNITED STATES PATENT OFFICE.

CARL C. JENSEN, OF CHICAGO, ILLINOIS.

FASTENING DEVICE.

Application filed June 18, 1923. Serial No. 646,048.

*To all whom it may concern:*

Be it known that I, CARL C. JENSEN, a citizen of the United States, residing at Chicago, in the county of Cook and State of Illinois, have invented a certain new and useful Improvement in Fastening Devices, of which the following is a full, clear, concise, and exact description, reference being had to the accompanying drawings, forming a part of this specification.

My invention relates to fastening devices and more particularly to fastening devices for joining the corners or other portions of wood structures and the like, although it is to be understood that the invention is not to be limited to a particular use or to joining any particular sort of members but may be employed in all similar work.

The invention contemplates an improved fastening device of novel, simple and inexpensive construction which will bind the members joined thereby, fast, securely and neatly together. By the use of my improved fastening device the members to be joined may be prepared for joining in a simple and inexpensive manner with standard tools now in use as distinguished from a device that requires special formation of the members by special tools. Thus tools used for other work are made available for preparing the members for joining. The formation of the device and of the mortises with which it cooperates facilitates insertion of the device and joining of the members.

In the drawings:

Figure 1 is a plan view of two corner pieces joined together with a device embodying the invention.

Fig. 2 is a cross section on line 2—2 of Figure 1.

Fig. 3 is a plan view of one of the corner pieces of Figure 1 showing the mortise with which the device cooperates, and;

Fig. 4 is an isometric view of the fastening device.

The fastening device shown comprises a pair of metallic channels 5 and 6 each of which comprises a base or web 7 having projecting flanges or legs 8. Channels 5 and 6 are secured together back-to-back by welding, soldering or otherwise securing the outer surface or back of web 7 of one channel to the outer surface or back of web 7 of the other channel, flanges 8 projecting in opposite directions from the plane along which the channels are united or secured together.

Members 9 and 10 selected for illustration are shown as the parts of a miter joint of a wood structure. The particular angle of the joint is of course immaterial. In fact, should it be desirable, the device of my invention may be employed for joining members arranged parallel to each other instead of at an angle and also for joining parts at points other than the corner.

In the embodiment shown the plane of the abutting surfaces of members 9 and 10 bisects the angle formed by the abutting pieces. Each of the abutting pieces is dressed to the proper angle, in the embodiment shown to an angle of 45 degrees. Dovetail mortises 11 are then cut into the abutting surfaces 12 of members 9 and 10 with the usual or standard dovetailing tool now in use. The surfaces 13 formed by the tool spread inwardly as shown and the lead of the standard dovetailing tool forms grooves 14 along the inner edges of surfaces 13 as well understood by those skilled in the art. I utilize these grooves 14 formed by the standard tools now in use in securing a fast, neat joint.

Flanges or legs 8 of channels 5 and 6 spread outwardly from webs 7 to form dovetail tenons which tenons fit in dovetail mortises 11 to securely bind pieces 9 and 10 together. The margins or free edges of flanges 8 are turned outwardly at 15 and these outturned margins 15 engage in grooves 14 when the fastener is inserted to bind the pieces together. An exceedingly fast, secure and neat joint is the result.

The practical use of the device is simple and it is believed that the manner of inserting same and connecting members 9 and 10 therewith will now be understood without a detailed discussion of the same. Pieces 9 and 10 may be arranged together with the mouths of mortises 11 in alignment and the fastener then inserted with the plane of the abutting sides of web 7 in the plane of the abutting surfaces 12 or the fastener may be inserted in either piece and the other pieces then engaged over the fastener. The fastener may be inserted so as to be embedded and the surface of the joint finished so as to leave no showing of the means employed in securing the parts together.

The device illustrated is a specific embodiment of the invention. I do not intend to be limited to the precise details shown.

I claim:

1. A fastening device comprising a pair of channels having webs secured together back-to-back, and flanges projecting from said webs and forming tenons, said flanges having out-turned margins.

2. A fastening device comprising a pair of channels having webs secured together back-to-back, and flanges projecting from said webs and spread to form dovetail tenons, said flanges having out-turned margins.

In witness whereof, I hereunto subscribe my name this 15 day of June, 1923.

CARL C. JENSEN.